(12) United States Patent
Lister

(10) Patent No.: US 8,351,960 B2
(45) Date of Patent: Jan. 8, 2013

(54) TELECOMMUNICATION NETWORK AND NETWORK MANAGEMENT TECHNIQUES

(75) Inventor: David Lister, Newbury (GB)

(73) Assignee: Vodafone Group PLC, Newbury, Berkshire, (GB)

(*) Notice: Subject to any disclaimer, the term of this patent is extended or adjusted under 35 U.S.C. 154(b) by 231 days.

(21) Appl. No.: 12/587,227

(22) Filed: Oct. 2, 2009

(65) Prior Publication Data

US 2010/0087208 A1    Apr. 8, 2010

(30) Foreign Application Priority Data

Oct. 3, 2008 (GB) .................................. 0818114.1

(51) Int. Cl.
*H04W 24/00* (2009.01)
(52) U.S. Cl. ...................... 455/456.5; 370/338; 370/328
(58) Field of Classification Search .................. 455/574, 455/445, 1, 432.1, 552.1, 560, 436, 101, 455/458, 412.2, 456.1, 88, 456.5, 437; 370/353, 370/338, 352, 328
See application file for complete search history.

(56) References Cited

U.S. PATENT DOCUMENTS

| | | | |
|---|---|---|---|
| 6,049,533 A * | 4/2000 | Norman et al. | 370/328 |
| 7,239,896 B1 * | 7/2007 | Hill et al. | 455/574 |
| 2002/0086635 A1 * | 7/2002 | Tomono | 455/1 |
| 2006/0019667 A1 * | 1/2006 | Hicks, III | 455/445 |
| 2006/0067285 A1 | 3/2006 | Caspi et al. | |
| 2006/0099950 A1 | 5/2006 | Klein et al. | |
| 2008/0076425 A1 | 3/2008 | Khetawat et al. | |
| 2008/0095129 A1 * | 4/2008 | Iyer | 370/338 |
| 2009/0129347 A1 * | 5/2009 | Woo | 370/338 |

FOREIGN PATENT DOCUMENTS

| | | |
|---|---|---|
| EP | 2301282 A1 | 3/2011 |
| JP | 2003-348104 | 12/2003 |
| WO | WO 2004/075583 A1 | 9/2004 |
| WO | WO 2009/058068 A1 | 5/2009 |

* cited by examiner

*Primary Examiner* — Kiet Doan
(74) *Attorney, Agent, or Firm* — Muirhead and Saturnelli, LLC

(57) ABSTRACT

In a mobile telecommunications network including a micro base station, a method of controlling the micro base station includes: determining one or more registered users of the micro base station; determining a location of the one or more registered users; and causing the micro base station to transition between a first operational mode and a second operational mode depending upon the location of at least one of the one or more registered users.

16 Claims, 1 Drawing Sheet

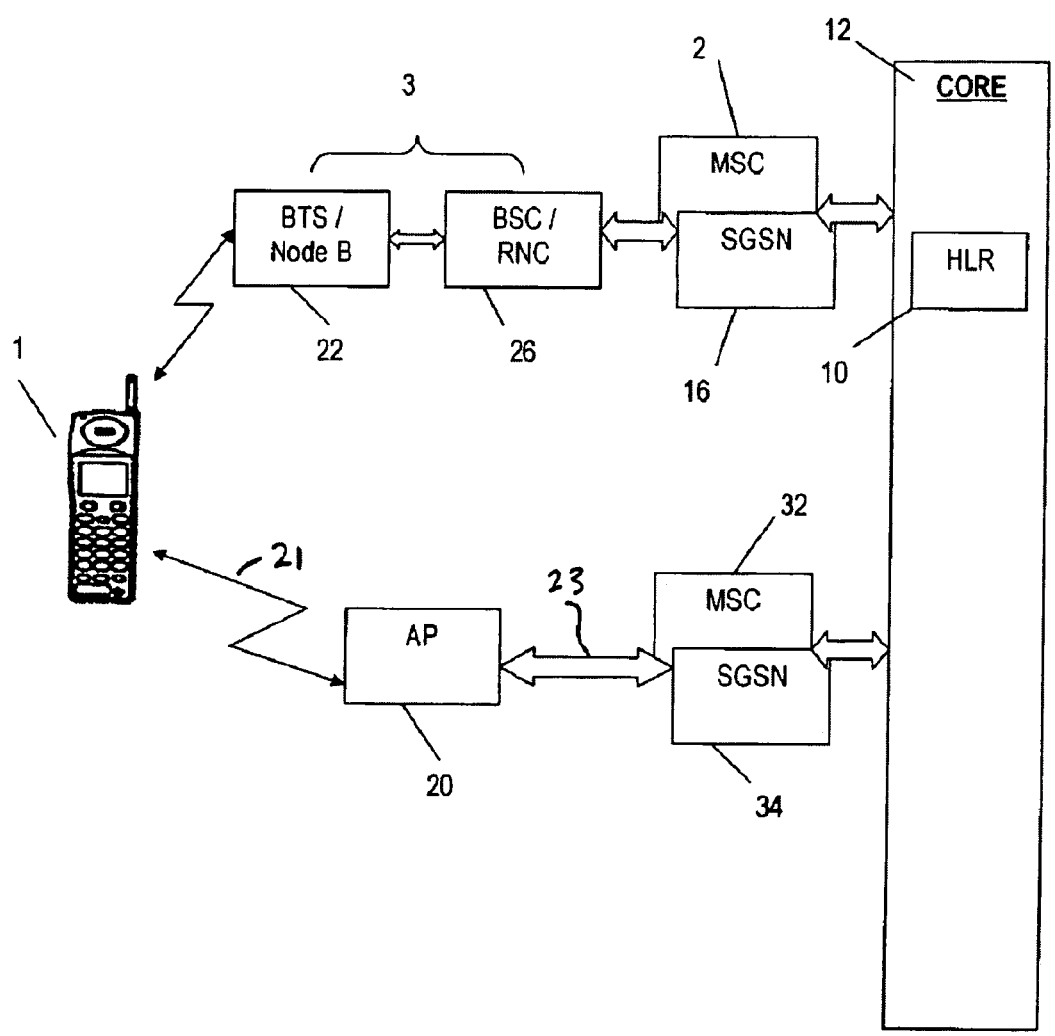

TELECOMMUNICATION NETWORK AND NETWORK MANAGEMENT TECHNIQUES

TECHNICAL FIELD

This application relates to a method of controlling a micro base station, and more particularly to a method of controlling a micro base station in a mobile telecommunications network including macro base stations and micro base stations in order to reduce power consumption and/or interference by the micro-base station. This application also relates to a micro base station for use in such a mobile telecommunications network and a network element for controlling a micro base station.

BACKGROUND OF THE INVENTION

There have recently been proposals to allow access to the features and services provided by cellular networks, such as GSM and UMTS networks, other than by accessing those networks in the conventional manner. In this regard, the conventional manner is by signalling between a mobile terminal and a conventional base station (macro base station) that has a dedicated connection to a Mobile Switching Centre (MSC). The MSC is a component of the network which controls radio resource management, in order to ensure that a user is connected to the best base station in terms of signal strength or quality.

It has been proposed to increase network capacity by providing additional special base stations, referred to here as micro base stations or access points (APs), for example at a subscriber's home or office. Many different names have been given to micro base stations such as access points (APs), home access points (HAPs), pico-base stations, pico-cells and femto-cells, but all names refer to the same apparatus. APs provide short range, localized cellular telecommunications coverage, and are typically purchased by, or rented to, a subscriber to be installed in their house or business premises.

These micro base stations may be dedicated network access points, or may be enhanced wireless internet hubs (i.e. providing wireless internet access, as well as wireless telecommunications network access). The range of micro base stations is significantly smaller than macro base stations, typically providing coverage to a range less than 100 metres.

Such APs can be installed and provisioned by the end consumer and may have a "closed" list of users who are able to connect to the access point. Where such an AP is installed at residential premises, these users could include the residents of the house, close friends and family as well as regular visitors who are known to the property owner.

By having a "closed" AP, only those users known to the consumer will be allowed to connect to the AP and so the resource is reliably reserved for those users. This contrasts with an "open" AP in which any user who is within the radio coverage of the AP can connect.

An advantage of introducing APs in existing telecommunications networks is that, where sufficient numbers of APs are implemented, the power level of the macro coverage could be reduced, due to a lower demand for the macro-base stations. Power reductions of course result in energy and financial savings, for instance due to less spectrum being required and also less hardware.

A further advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is be integrated into a DSL modem/router and uses DSL to backhaul the traffic to the communication network. This provides a high bandwidth and advantageously allows the AP to be capable of delivering services that require high data rates.

A still further advantage is that APs enable mobile network access to be provided in areas where there is no macro radio access network coverage. For example, an AP could provide 3G coverage in an area where there is no macro 3G coverage at all, perhaps only macro GSM coverage. The use of APs as an additional or alternative means for accessing the network, which therefore advantageously increases the network capacity.

However, additional challenges arise in implementing these access points in a well-integrated telecommunications network. For instance, because APs are. installed by a consumer they may be located in an area in which the radio coverage provided by the access point interferes with that of the existing cellular network. This occurs because both the AP and the cellular network are sharing the same frequency resource. In such cases, this interference can lead to localised coverage holes appearing in the existing cellular network. This arises because users not registered with the AP may experience a strong signal from it but are unable to connect to it because it is "closed". This can lead to dropped calls in the cellular network, or forced handover to another radio system. Overall, the result is a degraded quality of service for many users in the cellular network and a reduction in the efficiency of the network as fewer users can be carried satisfactorily.

A further problem is that APs continually draw power to transmit a radio broadcast channel, as per the normal operation of a base station. In this regard, the broadcast channel is required to enable a user to initially "hear" whether it is in range of an AP and to support the required call set up signalling. However, for closed APs, since only a limited set of users can access it, the usage of it is likely to be intermittent or only for a short of time during the day. Therefore, being continuously operational and accordingly continuously consuming power, introduces a cost to the owner of the AP, and also has an adverse environmental impact due to the power wastage.

One solution to this problem is to let the end-user determine the "on-time" of the AP by powering it down when not in use, by physically switching it off at the mains switch. The user must then switch it back on when again requiring use of the AP. In practice, however may users will forget to switch off the AP, as it may be inconvenient to do so and as a result the owner will tally a greater bill for consumed electricity. In addition, the unnecessary transmission of broadcast channels by the AP will lead to increased interference in the surrounding network.

Further, if the user forgets to switch the AP back on, he may find himself connected unexpectedly to another base station and may experience a lower quality of service and/or a different tariff (e.g. where a reduced tariff is offered by the network provider when the AP is used as a base station).

Not only is powering down an AP by switching it off at the mains an ungraceful approach, but it may also result in data residing in the AP (e.g. network configuration information such as neighbouring cells and handover settings) being lost. This data would then need to be restored on power up, which would typically introduce delays into the power up procedure.

SUMMARY OF THE INVENTION

According to the system described herein, in a mobile telecommunications network including a micro base station, a method of controlling the micro base station includes: determining at least one registered user of the micro base station; determining a location of the at least one registered user; and sending an instruction to the micro base station to transition between a powered up mode and a powered down mode depending upon the location of the at least one registered user.

An instruction may be sent to the micro base station to power up when one of the at least one registered users is in the vicinity of the micro base station.

Similarly, an instruction may be sent to the micro base station to power down when all of the at least one registered users are outside the vicinity of the micro base station.

It is also noted that the location of the at least one registered user may be determined by monitoring location area updates.

These aspects of the system described herein allow a micro base station to be powered down/up based on knowledge gained about the location of registered users relative to that of the micro base station.

In this way, by utilising information regarding the location of a micro base station's registered users, being information such as location area update information and/or a traffic profile of those users, it becomes possible to control the timing of when the micro base station is activated/deactivated, thereby obtaining a balance between maximising its utility to those registered users, and minimising network interference caused by the micro base station on other users/base stations. It also allows the AP to minimise power usage.

BRIEF DESCRIPTION OF THE DRAWING

Embodiments of the system described herein will now be explained in relation to the sole FIGURE, which illustrates an example mobile telecommunications network including an access point in addition to a conventional base station, in which the embodiments of the system described herein may be implemented.

DETAILED DESCRIPTION OF VARIOUS EMBODIMENTS

Certain elements of a mobile telecommunications network, and its operation, will now briefly be described with reference to the sole FIGURE.

It has also been proposed to use APs in the Long Term Evolution (LTE) telecommunications network currently being developed, but not yet implemented. LTE is likely to be the next network implementation after 3G. Overall, the system described herein is applicable to any type of cellular telecommunications system, including GSM, 3G and LTE.

Each base station (e.g. base station 3 and AP 20) corresponds to a respective cell of the cellular or mobile telecommunications network and receives calls from and transmits calls to a mobile terminal in that cell by wireless radio communication in one or both of the circuit switched or packet switched domains. Such a subscriber's mobile terminal (UE) is shown at 1. The mobile terminal may be any portable telecommunications device, including a handheld mobile telephone, a personal digital assistance (PDA) or a laptop computer equipped with a datacard.

In a GSM mobile telecommunications network, each base station 3 comprises a base transceiver station (BTS) 22 and a base station controller (BSC) 26. A BSC may control more than one BTS. The BTSs and BSCs comprise the radio access network.

In a UMTS mobile telecommunications network, each base station 3 comprises a node B 22 and a radio network controller (RNC) 26. An RNC may control more than one node B. The node Bs and RNCs comprise the radio access network.

In the proposed LTE mobile telecommunications network, each base station 3 comprises an eNode B, which effectively combines the functionality of the node B and the RNC of the UMTS network.

Conventionally, in a GSM/UMTS network, the base stations are arranged in groups and each group of base stations is controlled by a mobile switching centre (MSC) 2 and an SGSN (Serving GPRS Support Node) 16. MSC 2 supports communications in the circuit switched domain—typically voice calls, and corresponding SGSN 16 supports communications in the packet switched domain—such as GPRS data transmissions. SGSN 16 functions in an analogous way to MSC 2. The base station 3 has a dedicated (not shared) connection to its MSC 2, typically a cable connection. This prevents transmission speeds being reduced due to congestion caused by other traffic.

In the LTE network, it is proposed that the base stations are arranged in groups and each group of base stations is controlled by a Mobility Management Entity (MIME) and a User Plane Entity (UPE).

The radio link 21 from the AP 20 to the mobile terminal 1 uses the same cellular telecommunication transport protocols as the conventional base station 3 but with a smaller range—for example 25 m. The AP 20 appears to the mobile terminal 1 as a conventional base station, and no modification to the mobile terminal 1 is required to operate with the AP 20. The AP 20 performs a role corresponding to that of macro base station 3.

Communications between the access point 20 and the core network 12 are preferably IP based communications, and may be, for example, transmitted over a broadband IP network (and routed via the Internet). The communications are routed via MSC 32 or SGSN 34. The access point 20 converts the cellular telecommunications transport protocols used between the mobile terminal 1 and the AP 20 to IP based signalling.

The connection 23 between the access point 20 and the core network 12 may use the PSTN telephone network. Typically a DSL cable connects the access point 20 to the PSTN network. The data is transmitted between the access point 20 and the core network 12 by IP transport/DSL transport. The bandwidth of the cable connection between the access point and the telephone exchange is shared with multiple other users (typically between 20 and 50 other users).

The access point 20 may be connected to the core network 12 by means other than a DSL cable and the PSTN network. For example, the access point 20 may be connected to the core network 12 by a dedicated cable connection that is independent of the PSTN, or by a satellite connection between the access point 20 and the network core 12.

AP 20 would typically be configured to serve a Wireless Local Area Network (WLAN) located in a home or office, in addition to GSM/UMTS/LTE networks. The WLAN could belong to the subscriber of the mobile terminal 1, or be an independently operated WLAN. The owner of AP 20 can prescribe whether the AP is either open or closed, whereby an open AP is able to carry communications from any mobile device in the GSM/UMTS/LTE network, and a closed AP is only able to carry communications from specific pre-designated mobile devices.

With this background in mind, an implementation of an embodiment of the system described herein will now be described, which seeks to control the operation of a micro base station, such as AP 20, in order to, inter alia, reduce interference caused by the AP due to being active unnecessarily.

A feature of this embodiment of the system described herein is that the location of the AP 20 is known by the network. This can be achieved by any appropriate means, including from information obtained through registration information collected from the owner of the AP upon purchase. Alternatively, the location may be determined by radio measurements that the AP records and returns to the core network. For example, the AP can record the serving and neighbouring cell identification codes at its location (e.g. from BS 3) and report that to the core network 12 via its fixed link 23. From this information the core network can then determine, or confirm, the AP's position, and in this particular embodiment, determine a location area to which the AP belongs. In a still further alternative, the AP could be fitted with a satellite receiver and obtain location fixes from GPS or alternative satellite systems.

In this regard, in a UMTS/GSM network, the coverage area of the mobile telecommunications network is divided into a plurality of location areas (LAs) (for circuit switched communications) and into a plurality of routing areas (RAs) (for packet switched communications). The equivalent areas in the proposed LTE network are described as tracking areas (TAs). For each mobile terminal, the core network 12 will have a record of the terminal's last recorded position and one or more tracking areas/location areas/routing areas, associated with that last location. Typically, although not necessarily, a location area/tracking area/routing area is larger than the area of a single cell and within the area covered by a single MSC.

This embodiment will be described in relation to LAs, but obviously the other equivalent areas may alternatively, or additionally, be used.

In addition to the core network having knowledge of the AP's location area, it also determines the users that are registered to use the AP. This information is typically stored in the HLR 10.

A registered user may be identified by the core network by any appropriate means, including a terminal identifier (e.g. IMEI—International Mobile Equipment Identifier), a user/SIM identifier (e.g. IMSI—International Mobile Subscriber Identifier) and/or the MSISDN (Mobile Station International Subscriber Directory Number), or a combination thereof.

Once the core network has determined the location of the AP and its registered users, the core network will then monitor the locations of the registered users to determine when at least one of those users comes into proximity to the AP. In this embodiment, this can be done simply by the network monitoring the Location Area recorded for each of the registered users. In this regard, under standard mobility management procedures the core network will be aware of the location area of all mobile terminals that are switched on, and either active or idle, as each mobile terminal will be communicating through or camped on a base station, and all base stations have Location Area ID. When a registered user moves to the same Location Area as the AP (or even a neighbouring one), then this serves as a trigger for the core network to activate the AP from its sleep mode. In other words, the location of the registered users relative to the AP is used to control the powering up and down of the AP.

It is to be appreciated that in this embodiment, when the AP is powered up and registered as a base station with the mobile network, the AP will remain active as long as at least one user who is registered as an authorised user of the AP is in the vicinity of the AP. Whilst in sleep mode, the AP 21 will still be connected to the network, via the fixed connection 23, and can recommence transmissions when instructed by the network. During sleep mode, configuration details of the AP will remain available so that a fast transition to broadcast mode can be made. Further, in sleep mode, the AP will only draw a low level of power from the mains supply.

The core network will activate the dormant AP when one of the AP's registered users enters the location area that is common to the AP by signalling to the AP. This will cause the AP to transition from sleep mode to an active mode where it commences broadcasting its AP ID, so that the proximate registered UE is made aware of the AP's presence, and able to connect to it.

Once all registered users have moved away from the AP, the AP will revert to an inactive mode, or "sleep" mode, preferably after a predetermined period of time. In other words, once the core network has determined that all registered users are not in the AP's vicinity, after the predetermined time, it will signal to the AP to cease transmission of the broadcast channels and enter a sleep mode.

It is preferable that the AP does not go into sleep mode as a result of a registered user simply switching off his UE whilst in the coverage area of the AP, entering a localised area of no coverage, or as a result of a flat battery, for example. Therefore, to avoid the AP being deactivated in these situations, it is preferable that a default position is utilised, where if no knowledge of the location of a user is available to the network, then it is assumed that the user is in the local vicinity of the AP (e.g. in the building/house) and that the AP should be transmitting.

According to alternative embodiment of the system described herein, rather than a network element being responsible for controlling the power modes of the AP, the AP is responsible for controlling itself. In other words, in this embodiment, the AP may be activated or deactivated using an internal trigger, rather than an external one.

In this regard, the AP is responsible for sensing the proximity of its registered APs. This may be determined using a low powered short range radio access technology such as Bluetooth, UWB (UltraWideBand), Wi-Fi, DECT (Digital Enhanced Cordless Telecommunications), or near field communication (NFC) wireless systems.

In this embodiment of the system described herein, a registered user/terminal is typically "paired" with an AP upon registration therewith. Once the AP is aware of the registered user/terminal ID, the AP then "listens" for the presence of the user using its applicable wireless technology. For instance, if no registered users are within the vicinity of the AP it will have powered itself down into a sleep mode. Ideally this sleep mode is a low power mode which retains network configurations, so that the AP can reinstate itself in the mobile network with minimal delay. The recognition of the presence of such a registered user acts as a trigger to transition the AP from its sleep mode to an active broadcast mode. Upon the AP reverting to its broadcast mode, the AP will recommence transmission of its broadcast channel.

As a specific example, the low power short range technology could be Bluetooth, and the AP could act as a Master in a local piconet, whilst the terminals which are registered to it act as a Slave. If the Master receives no response to its broadcast message then the AP can choose to disable the transmission of any GSM/UMTS/LTE broadcast signals and switch to a sleep mode.

The AP may continue to monitor the proximity of the registered users that have entered its communication zone. Then, upon all registered users no longer being detected as proximate, the AP may power itself down again into sleep mode. This is preferably done after a predetermined time period from when registered users are no longer detected. This time period may be optimised by the network operator, configured dynamically or selected by the owner of the AP. By allowing a given time period before powering down, instances of UEs going out of range for a short period of time (e.g. momentarily) are accounted for.

In this embodiment of the system described herein, it is not essential that the AP's position is known by the network, as it is the relative proximity between the AP and its registered UEs that is important.

The embodiments just described are to be considered illustrative of the system described herein, as alterations and additions are possible. For instance, although the system described herein has been described in relation to a closed micro base station/AP, with specific registered users in relation to whom the power modes of the AP are controlled, the principle of the system described herein may also be applied to open APs. For open APs, there may be certain users that regularly use the AP (e.g. the owners), and the AP is configured to be powered up or down depending upon the location of those users relative to the AP. Therefore, when one of those registered users is proximate, the AP will be powered up, and thereafter available to all, until a point in time again when no registered users are proximate. The AP may be open in this scenario rather than closed, as there may be a financial incentive for the owner.

In a further alternative, where the AP is a closed AP, with a list of registered users, it may only be a subset of those registered users for who the AP is powered up or down, as appropriate. For instance, an owner of an AP may only want an AP to be powered up for certain family members. This may be useful for owners to ensure that the AP network usage by the other family members/registered users is supervised.

Further, the core network may determine the location of the one or more registered users and/or the AP by means other than by determining their Location Area. For instance, the core network may obtain location information using triangulation, a Global Positioning System, the Cell ID of a cell serving a UE, distance approximations and/or bearing information from a base station.

In a still further alternative, each registered user's location may be determined based upon a traffic profile. This traffic profile may be based upon predetermined and/or known movement patterns of the users. For example, user A may typically only be at home from 7 pm to 7 am from Monday to Friday, and so the transition of the AP may be based upon this known pattern. An ability to override the traffic profile should accompany this technique, in case the user is home outside his normal pattern.

A still further alternative makes use of the fact that APs typically combine the functionality of a wireless system such as WLAN (Wireless Local Area Network) with the 3GPP mobile telecommunications technology. Therefore, in this alternative the principle of the system described herein may be applied to the WLAN transmitter such that the proximity information is additionally used to power down the WLAN transmitter, or in fact any other power loads on the AP, of which WLAN is a key example. In this way the power drawn from the WLAN components can also be minimised by transferring the WLAN to sleep mode when not required.

The principle of the system described herein may also be used to transition the AP between being in an open mode, to a closed mode. For instance, if there are registered users in the vicinity of the AP, then the AP may configure itself to be closed, and only accessible by its registered users. Once those registered users have left the AP's vicinity however, the AP may reconfigure itself to transition to an open mode and available to any UE in its vicinity.

This embodiment of the system described herein would be useful in an office environment, where the AP is closed to all but office employees during business hours, but once all employees have left for the day, the AP is made available to any proximate UEs to access the mobile network. This would be particularly useful for an AP positioned in a remote location where there is little or no macro base station coverage, as it would provide network coverage to all out of hours, and also preserve its usefulness to the owner by being closed during office hours, thereby eliminating the possibility of outsiders "hogging" its coverage during core hours.

Various of the embodiments discussed herein may be combined with each other in appropriate combinations in connection with the system described herein. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of controlling a micro base station of a mobile telecommunications network, the method comprising:
   determining one or more registered mobile terminal users of the micro base station, wherein the micro base station is an access point for mobile terminals to the mobile telecommunications network;
   determining a location of the one or more registered mobile terminal users;
   causing the micro base station to transition between a first operational mode and a second operational mode depending upon the location of at least one of the one or more registered mobile terminal users; and
   using a sensor configured to sending a transition instruction to the micro base station based upon the proximity, of one or more registered mobile terminal users to the micro base station, wherein the transition instruction does at least one of the following:
   (i) causes the micro base station to transition from a sleep mode to an active mode upon the sensor determination that one or more registered mobile terminal users are proximate to the micro base station; or
   (ii) causes the micro base station to transition from an active mode to a sleep mode upon the sensor determination that no registered mobile terminal users are proximate to the micro base station.

2. The method of claim 1, wherein causing the micro base station to transition between modes includes sending an instruction to the micro base station to power up when at least one of the one or more registered mobile terminal users is in the vicinity of the micro base station.

3. The method of claim 2, wherein each of the one or more registered mobile terminal users are determined as being within the vicinity of the micro base station as a default position.

4. The method of claim 3, wherein the default position is implemented when no information is available as to the location of the mobile terminal registered user.

5. The method of claim 1, wherein causing the micro base station to transition between modes includes sending an instruction to the micro base station to power down when all of the one or more registered mobile terminal users are outside the vicinity of the micro base station.

6. The method of claim 1, wherein the location of the one or more registered users is determined by at least one of:
   a) monitoring location area update communications relating to the one or more registered mobile terminal users;
   b) using a triangulation method relative to base stations adjacent the one or more mobile terminal registered users;
   c) using information from a Global Position System (GPS);
   d) determining a cell ID serving the one or more registered mobile terminal users; and
   e) using a short range radio access technology such as Bluetooth relative to the micro base station.

7. The method of claim 1, further comprising:
   determining the location of the micro base station using at least one of:
   a) information provided on registration of the micro base station;
   b) radio measurement information provided by an installed micro base station to the core network;
   c) using information from a Global Position System (GPS); and
   d) neighbouring cell information provided by an installed micro base station to the core network.

8. A network element configured to perform the method according to claim 1.

9. A network element configured for use in a mobile telecommunications network, the network element being an access point for mobile terminals to the mobile telecommunications network and comprising:
   a controller configured to:
      determine one or more registered mobile terminal users of a micro base station;
      determine a location of the one or more registered mobile terminal users; and
      cause the micro base station to transition between a first operational mode and a second operational mode depending upon the location of at least one of the one or more registered mobile terminal users; and
   a sensor configured to send a transition instruction based upon the proximity of one or more registered mobile terminal users to the micro base station, wherein the transition instruction does at least one of the following:
      (i) causes the micro base station to transition from a sleep mode to an active mode upon the sensor determining one or more registered mobile terminal users to be proximate to the micro base station; or
      (ii) causes the micro base station to transition from an active mode and a sleep mode upon the sensor determining no registered mobile terminal users to be proximate to the micro base station.

10. The network element of claim 9, wherein the controller is further configured to send an instruction to the micro base station to power up when at least one of the one or more registered mobile terminal users is in the vicinity of the micro base station.

11. The network element of claim 10, wherein the controller is configured to implement a default position of a registered mobile terminal user being within the vicinity of the micro base station when no information is available as to the location of the registered mobile terminal user.

12. The network element of claim 9, wherein the controller is further configured to send an instruction to the micro base station to power down when all of the one or more registered mobile terminal users are outside the vicinity of the micro base station.

13. The network element of claim 9, wherein the controller is configured to determine the location of the one or more registered mobile terminal users by at least one of:
   a) monitoring location area update communications relating to the one or more registered mobile terminal users;
   b) using a triangulation method relative to base stations adjacent to the one or more registered mobile terminal users;
   c) using information from a Global Position System (GPS);
   d) determining a cell ID serving the one or more registered mobile terminal users; and
   e) using a short range radio access technology such as Bluetooth relative to the micro base station.

14. The network element of claim 9, wherein the controller is configured to determine the location of the micro base station using at least one of:
   a) information provided on registration of the micro base station;
   b) radio measurement information provided by an installed micro base station to the core network;
   c) neighbouring cell information provided by an installed micro base station to the core network.

15. A micro base station configured for use in a mobile telecommunications network, the micro base station being an access point for mobile terminals to the mobile telecommunications network and comprising:
   an input device configured to receive a transition instruction;
   a controller configured to use the transition instruction to cause the micro base station to transition between a first operational mode and a second operational mode; and
   a sensor configured to send the transition instruction to the input device based upon the proximity of one or more registered mobile terminal users to the micro base station, wherein the controller is configured to do at least one of the following:
      (i) cause the micro base station to transition from a sleep mode to an active mode upon the sensor determining one or more registered mobile terminal users to be proximate to the micro base station; or
      (ii) cause the micro base station to transition from an active mode to a sleep mode upon the sensor determining no registered mobile terminal users to be proximate to the micro base station.

16. The micro base station of claim 15, wherein the input device is configured to receive an activation instruction from a network element, the network element being configured to:
   determine one or more registered mobile terminal users of the micro base station;
   determine a location of the one or more registered mobile terminal users; and
   cause the micro base station to transition between a first operational mode and a second operational mode depending upon the location of at least one of the one or more registered mobile terminal users.

* * * * *